US008873378B2

(12) United States Patent
Wei (10) Patent No.: US 8,873,378 B2
(45) Date of Patent: Oct. 28, 2014

(54) SWITCHING METHOD AND SYSTEM FOR ETHERNET PATH PROTECTION (75) Inventor: Yuehua Wei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 43 days.

(21) Appl. No.: 13/259,059

(22) PCT Filed: Dec. 21, 2009

(86) PCT No.: PCT/CN2009/075797
§ 371 (c)(1),
(2), (4) Date: Feb. 28, 2012

(87) PCT Pub. No.: WO2011/022910
PCT Pub. Date: Mar. 3, 2011

(65) Prior Publication Data
US 2012/0147741 A1  Jun. 14, 2012

(30) Foreign Application Priority Data

Aug. 31, 2009 (CN) .......................... 2009 1 0169679

(51) Int. Cl.
*H04L 12/707* (2013.01)
*H04L 12/703* (2013.01)
*H04L 12/413* (2006.01)
*H04L 12/24* (2006.01)
*H04L 12/26* (2006.01)

(52) U.S. Cl.
CPC .............. *H04L 45/28* (2013.01); *H04L 12/413* (2013.01); *H04L 41/0654* (2013.01); *H04L 41/0681* (2013.01); *H04L 43/0817* (2013.01); *H04L 45/22* (2013.01)
USPC ........................................................ 370/225

(58) Field of Classification Search
CPC ...... H04L 41/0654; H04L 45/22; H04L 45/28
See application file for complete search history.

(56) References Cited

U.S. PATENT DOCUMENTS

| 7,804,767 | B1 * | 9/2010 | Owens et al. ................. 370/217 |
| 2003/0145246 | A1 * | 7/2003 | Suemura ............................ 714/2 |
| 2007/0086333 | A1 * | 4/2007 | Doukai et al. ................. 370/228 |

FOREIGN PATENT DOCUMENTS

| CN | 1929390 A | 3/2007 |
| CN | 1953396 A | 4/2007 |
| WO | 2009089642 A1 | 7/2009 |

OTHER PUBLICATIONS

International Search Report in international application No. PCT/CN2009/075797, mailed on May 13, 2010.

(Continued)

*Primary Examiner* — Huy D Vu
*Assistant Examiner* — Bao G Nguyen
(74) *Attorney, Agent, or Firm* — Oppedahl Patent Law Firm LLC (57) ABSTRACT

A switching method for Ethernet path protection is provided in the disclosure. The method includes: setting a group of Traffic Engineering Service Instances (TESIs) protected by a protection group; detecting statuses of a working entity and a protection entity; implementing the path protection switching according to an outbound port configured for Ethernet Switching Path (ESP) of the TESI at the endpoint of the protection group and in conjunction with a corresponding protection switching mechanism selected in current status detection. A switching system for Ethernet path protection is also provided in the disclosure, wherein a switching unit is configured to implement the path protection switching according to the outbound port configured for the ESP of the TESI at the endpoint of the protection group and in conjunction with the corresponding protection switching mechanism selected in current status detection. The method and system of the disclosure can enhance the speed of fault recovery, reduce nodes for the protection switching, be beneficial to network optimization, and ensure the reliability of end-to-end traffic.

6 Claims, 4 Drawing Sheets

(56) References Cited

OTHER PUBLICATIONS

English Translation of the Written Opinion of the International Search Authority in international application No. PCT/CN2009/075797, mailed on May 13, 2010.

Supplementary European Search Report in European application No. 09848642.6, mailed on Apr. 14, 2014.
Metro Ethernet Deployment With Siemens PBB TE 5URPASS HID 6600 Mar. 13, 2007.

* cited by examiner

SWITCHING METHOD AND SYSTEM FOR ETHERNET PATH PROTECTION

TECHNICAL FIELD

The disclosure relates to the technical field of network communications, particularly to a switching method and system for Ethernet path protection.

BACKGROUND

As the conception of Carrier Ethernet (CE) is proposed, a connection-oriented Ethernet technology, Provider Backbone Transport (PBT), which satisfies the requirements of a telecommunication network emerged in October, 2005. After that, providers at home and abroad have adopted the PBT technology for networking, thereby offering a very good beginning for the development of the PBT technology in the Metropolitan Area Network (MAN).

The PBT technology is based on a Provider Backbone Bridge (PBB) technology defined by IEEE 802.1ah standard, wherein the IEEE takes the PBT technology as a Provider Backbone Bridge Traffic Engineering (PBB-TE) technology. The PBB-TE technology, which is based on the PBB technology and centered on improving the PBB technology, performs service forwarding by adopting an outer Media Access Control (MAC) address in combination with an outer Virtual Local Area Network (VLAN) identification, e.g. a Backbone Destination MAC Address (B-DA)+Backbone VLAN ID (B-VID), wherein the forwarding path is configured in advance. This is significantly different from forwarding a data message in a traditional Ethernet address learning way. By network management and control, services in the CE are made virtually connectively, so that the functions of the telecommunication network such as protection switching, Quality of Service (QoS), traffic engineering and the like can be realized. The PBB-TE technology is compatible with a framework of a traditional Ethernet bridge, and can forward data frames based on B-DA+B-VID without updating a network intermediate node or modifying the data frames, and the forwarding efficiency is high.

An attribute of a tunnel is represented as a triad of <ESP-DA, ESP-SA, ESP-VID>, in which ESP refers to a Ethernet Switching Path, the parameter ESP-DA refers to a Destination MAC Address of the Ethernet Switching Path, the parameter ESP-SA refers to a Source MAC Address of the Ethernet Switching Path, and the parameter ESP-VID refers to a B-VLAN value. A point-to-point Traffic Engineering Service Instance (TESI) is composed of a pair of bi-directional point-to-point ESPs. Specific descriptions associated with the triad and TESI can refer to the IEEE 802.1Qay standard.

Figure 1:
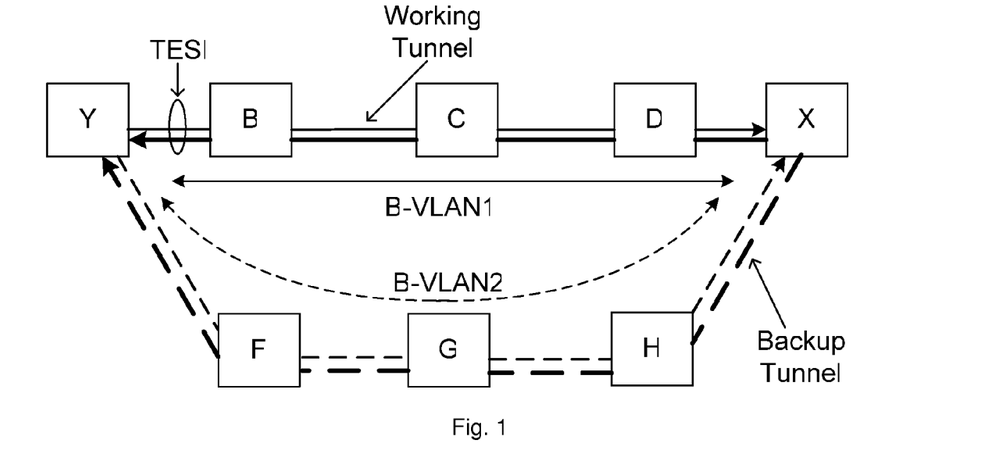
FIG. 1 shows a schematic diagram of 1:1 end-to-end TESI protection of the existing PBB-TE.

FIG. 1 shows a schematic diagram of Ethernet tunnel protection as adopting the existing PBB-TE technology. To take a direction from left to right in FIG. 1 for an example, the ESP of the end-to-end working tunnel (i.e. Y-B-C-D-X) is <B-MAC2, B-MAC1 and B-VLAN1>. Wherein, B-MAC2 is the MAC address of X, that is the destination MAC address; B-MAC1 is the MAC address of Y, that is the Source MAC Address; and B-VLAN1 is the B-VLAN value of Y-B-C-D-X.

In the prior art, 1:1 end-to-end protection of the tunnel has been implemented. As shown in FIG. 1, in the end-to-end working tunnel Y-B-C-D-X of the TESI, Y and X are endpoints of the tunnel instance; Y-F-G-H-X is an end-to-end backup tunnel of the TESI, that is, Y-F-G-H-X is the backup tunnel of Y-B-C-D-X. Wherein, Y-B-C-D-X is a bi-directional end-to-end working tunnel, and Y-F-G-H-X is a bi-directional end-to-end backup tunnel. Furthermore, a group of a working tunnel and a corresponding backup tunnel is constituted by a pair including the middle solid line along Y-B-C-D-X and the middle dashed line along Y-F-G-H-X; and another group of a working tunnel and a corresponding backup tunnel is constituted by a pair including the thick solid line along Y-B-C-D-X and the thick dashed line along Y-F-G-H-X. Therefore, when a fault is detected on Y-B-C-D-X, both the directions can be switched to Y-F-G-H-X. In order to distinguish whether a message is forwarded on the working tunnel or the backup tunnel, during configuration in advance, Virtual Local Area Network identifications (B-VLAN) carried by the tunnels are respectively specified for the working tunnel and the backup tunnel, for example, B-VLAN1 is specified for the working tunnel, and B-VLAN2 is specified for the backup tunnel.

The continuity of a tunnel is detected by sending a Continuity Check Message (CCM) via the tunnel, wherein the CCM is defined in the IEEE 802.1ag standard. The endpoints of the tunnel send the CCM to each other along the working tunnel and the backup tunnel respectively, and B-VLAN1 and B-VLAN2 are respectively encapsulated in message headers of the CCMs along the working tunnel and the backup tunnel. This can refer to the IEEE 802.1Qay standard.

When a tunnel traverses a very weak or very important path, protection can be performed only for a physical or logical path, or a locally physical or locally logical path of the end-to-end tunnel, which should be collectively called as path protection below without distinction. Path protection in the PBB-TE network can protect all tunnel instances carried on the path. The combination of the path protection and the 1:1 end-to-end tunnel instance protection can enhance the robustness of the PBB-TE network, enhance the speed of fault recovery, and reduce nodes involved in protection switching.

Figure 2:
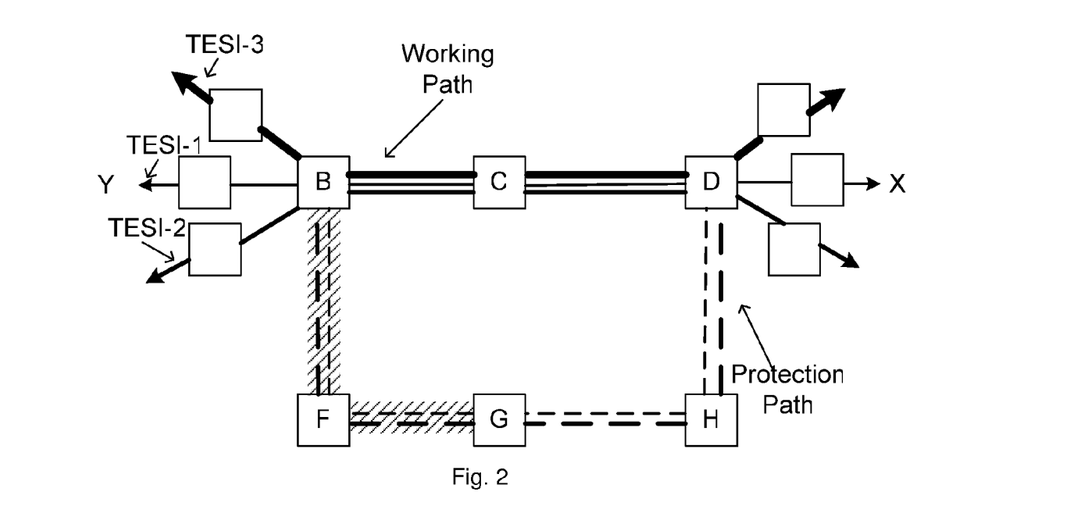
FIG. 2 shows a schematic diagram of path protection of an Ethernet tunnel.

As shown in FIG. 2, which shows a schematic diagram of path protection of a Ethernet tunnel, B-C-D is an end-to-end working tunnel, namely a bearing path of TESI-1, TESI-2 and TESI-3. Wherein, the protected objects are TESI-1 and TESI-2; B-C-D is a working path; and B-F-G-H-D is a protection path for the working path. The working path and the protection path constitute a path protection group. Namely, B-C-D is a working entity, and B-F-G-H-D is a protection entity for B-C-D. TESI-1 and TESI-2 are respectively configured as the protected objects of the path protection group at the endpoints B and D. When fault happens on the working entity B-C-D, TESI-1 and TESI-2 on the working entity of the protection group are switched to the protection entity. In FIG. 2,  refers to the protection group; TESI-1, TESI-2 and TESI-3 are respectively represented as different thick solid lines, wherein TESI-3 is the thickest, TESI-2 is the middle, and TESI-1 is the thinnest; and bridge equipments are represented as .

It is supposed that when protection switching is performed for a TESI protected in a PBB-TE network, protection switching is implemented by adopting a selected optimum outbound port, based on configured outbound ports and in conjunction with a corresponding protection switching mechanism selected in different status detection scenes, so that the protection switching can be implemented as soon as possible, thereby enhancing the speed of fault recovery, reducing nodes for the protection switching, being beneficial to network optimization, and ensuring the reliability of end-to-end traffic. However, such a solution does not exist at present.

SUMMARY

In view of this, the main subject of the disclosure is to provide a switching method and system for Ethernet path protection, which can enhance the speed of fault recovery, reduce nodes for the protection switching, be beneficial to network optimization, and ensure the reliability of end-to-end traffic.

In order to achieve the purpose above, the technical solution of the disclosure is realized as follows.

A switching method for Ethernet path protection includes:

setting, at an endpoint of a protection group, a group of Traffic Engineering Service Instances (TESIs) protected by the protection group, and detecting statuses of a working entity and a protection entity arranged in the protection group; and implementing path protection switching, according to an outbound port configured for an Ethernet Switching Path (ESP) of the TESI at the endpoint of the protection group and in conjunction with a corresponding protection switching mechanism selected in current status detection.

Wherein, the protection group may consist of the working entity and the protection entity; the working entity specifically is a same path traversed by the group of TESIs, and the protection entity specifically is a backup entity corresponding to the working entity; the working entity and the protection entity share the same endpoint.

Wherein, the method may further include configuring a Filter Data Base (FDB) entry at an intermediate node of the protection group.

Wherein, the method may further include configuring a FDB entry at the endpoint of the protection group for the ESP of the TESI respectively; wherein essential information of the FDB entry includes: a destination Media Access Control (MAC) address, a Virtual Local Area Network (VLAN) identification and an outbound port;

the outbound port further includes a working outbound port and one or more protection outbound ports which are respectively configured at the endpoint of the protection group for the ESP of the TESI; wherein the working outbound port corresponds to the working entity of the protection group, and the protection outbound port corresponds to the protection entity.

Wherein, the current status detection may specifically include: under a normal condition that no fault of the working entity is detected, selecting the working outbound port as the outbound port corresponding to the FDB entry of the ESP at the endpoint of the protection group;

or, the current status detection may specifically include: under a condition that a fault of the working entity is detected and no fault of the protection entity is detected, redirecting the TESI to the protection entity, and updating the outbound port of the FDB entry of the corresponding ESP to be the preset protection outbound port corresponding to the protection entity;

or, the current status detection may specifically include: under a condition that the protection group operates in a non-reverse mode, fault recovery of the working entity is detected and no fault of the protection entity is detected, the process of implementing the protection switching specifically includes: maintaining the outbound port of the FDB entry corresponding to the ESP at the endpoint of the protection group to be the corresponding protection outbound port;

or, the current status detection may specifically include: under a condition that the protection group operates in a reverse mode, fault recovery of the working entity is detected and no fault of the protection entity is detected, the process of implementing the protection switching specifically includes: after the endpoint of the protection group waiting for a period of time, recovering and redirecting the TESI to the working entity, and at the endpoint, updating or restoring the corresponding outbound port of the FDB entry of the corresponding ESP to be the working outbound port.

Wherein, one working entity may correspond to one or more protection entities.

A switching system for Ethernet path protection includes: a setting unit, a detecting unit and a switching unit; wherein the setting unit is configured to set, at an endpoint of a protection group, a group of TESIs protected by the protection group, and set a working entity and a protection entity in the protection group;

the detecting unit is configured to detect statuses of the set working entity and the protection entity;

the switching unit is configured to implement path protection switching, according to an outbound port configured for an ESP of the TESI at the endpoint of the protection group and in conjunction with a corresponding protection switching mechanism selected in current status detection.

Wherein, the switching unit may further include a configuration module and a protection switching implementation module; wherein the configuration module is configured to configure an FDB entry for the ESP of the TESI at the endpoint of the protection group respectively; wherein essential information of the FDB entry includes: a destination MAC address, a VLAN identification and an outbound port; the outbound port includes a working outbound port and one or more protection outbound ports which are respectively configured for the ESP of the TESI at the endpoint of the protection group; the working outbound port corresponds to the working entity of the protection group, and the protection outbound port corresponds to the protection entity;

the protection switching implementation module is configured to implement the path protection switching by selecting the corresponding working outbound port or protection outbound port according to the outbound ports corresponding to the working entity and the protection entity, which are configured at the endpoint of the protection group for the ESP of the TESI, and in conjunction with selected in the current status detection.

Wherein, the protection switching implementation module may be further configured to select the working outbound port as the outbound port corresponding to the FDB entry of the ESP at the endpoint of the protection group, under a normal condition that no fault of the working entity is detected;

or, the protection switching implementation module may be further configured to redirect the TESI to the protection entity and update the outbound port of the FDB entry corresponding to the ESP to be the preset protection outbound port corresponding to the protection entity, under a condition that a fault of the working entity is detected and no fault of the protection entity is detected;

or, the protection switching implementation module may be further configured to remain the outbound port of the FDB entry corresponding to the ESP at the endpoint of the protection group to be the corresponding protection outbound port, under a condition that the protection group operates in a non-reverse mode, fault recovery of the working entity is detected and no fault of the protection entity is detected;

or, the protection switching implementation module may be further configured to, after the endpoint of the protection group waiting for a period of time, recover and redirect the TESI to the working entity, and at the endpoint, update or restore the corresponding outbound port of the FDB entry corresponding to the ESP to be the working outbound port, under a condition that the protection group operates in a reverse mode, fault recovery of the working entity is detected and no fault of the protection entity is detected.

In the disclosure: setting a group of TESIs protected by a protection group at the endpoint of the protection group, and detecting statuses of the working entity and the protection entity arranged in the protection group; and implementing the path protection switching, according to the outbound port configured for the ESP of the TESI at the endpoint of the protection group and in conjunction with a corresponding protection switching mechanism selected in current status detection.

The disclosure is adopted to realize the switching solution for Ethernet path protection based on the PBB-TE, and realize the solution of quickly switching a protected group of TESIs from a working entity to a protection entity or from a protection entity to a working entity in a path within the PBB-TE network, thereby enhancing the robustness of the PBB-TE network. Moreover, protection switching can be implemented by adopting an selected optimum outbound port and in conjunction with a corresponding protection switching mechanism selected in different status detection scenes, so that the protection switching can be implemented as soon as possible undoubtedly, thereby enhancing the speed of fault recovery, reducing nodes for the protection switching, being beneficial to network optimization, and ensuring the reliability of end-to-end traffic.

DETAILED DESCRIPTION

The basic concept of the disclosure is: setting, at an endpoint of an protection group, a group of TESIs protected by the protection group; detecting statuses of a working entity and a protection entity arranged in the protection group; and implementing path protection switching, according to an outbound port configured for an ESP of the TESI at the endpoint of the protection group and in conjunction with a corresponding protection switching mechanism selected in current status detection.

Next, the implementation of the technical solution is further detailed with reference to the drawings.

Figure 3:
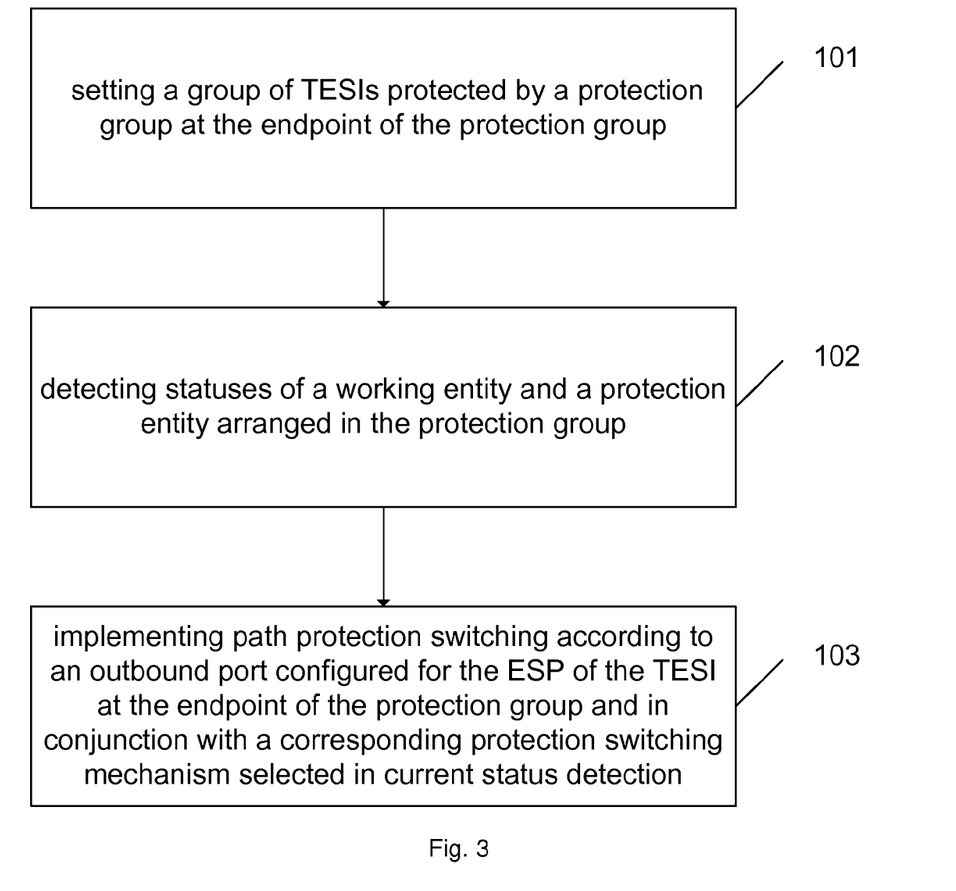
FIG. 3 shows a schematic diagram of implementation process of a method of the disclosure.

As shown in FIG. 3, a switching method for Ethernet path protection is provided, which comprises the following steps:

Step 101: setting a group of TESIs protected by a protection group at an endpoint of the protection group.

Step 102: detecting statuses of a working entity and a protection entity arranged in the protection group.

Herein, the protection group consists of the working entity and the protection entity; wherein the working entity specifically is the same path traversed by the group of TESIs, and the protection entity specifically is a backup entity corresponding to the working entity; and the working entity and the protection entity share the same endpoint.

Step 103: implementing the path protection switching, according to an outbound port configured for an ESP of the TESI at the endpoint of the protection group and in conjunction with a corresponding protection switching mechanism selected in current status detection.

For the technical solution constituted by steps 101-103, an FDB entry is further configured at an intermediate node of the protection group. The FDB entry is also configured at the endpoint of the protection group, other than at the intermediate node of the protection group.

As the FDB entry is configured at the endpoint of the protection group, the FDB entry is further configured at the endpoint of the protection group for the ESP of the TESI respectively. Wherein, the essential information of the FDB entry includes a destination MAC address, a VLAN ID and an outbound port.

In step 103, the configured outbound port further includes a working outbound port and one or more protection outbound ports, which are respectively configured at the endpoint of the protection group for the ESP of the TESI. Wherein, the working outbound port corresponds to the working entity of the protection group, and the protection outbound port corresponds to the protection entity.

In step 103, since there are different current status detection scenes, the specific processing procedures of the protection switching implemented correspondingly are different, which are elaborated specifically and respectively below.

For the first condition, the current status detection specifically is a normal condition that no fault of the working entity is detected.

The protection switching implemented correspondingly specifically is to select a working outbound port as the outbound port of the FDB entry corresponding to the ESP at the endpoint of the protection group, and at this time, the group of TESIs operate on the working entity.

For the second condition, a protection switching event happens, namely, the current status detection specifically is a condition that a fault of the working entity is detected, and no fault of the protection entity is detected.

The protection switching implemented correspondingly specifically is to redirect the TESI to the protection entity, and at the endpoint, update the outbound port of the FDB entry of the corresponding ESP to be the preset protection outbound port corresponding to the protection entity. After the protection switching, this group of TESIs will operate on the protection entity.

For the third condition, the current status detection specifically is a condition that a fault recovery of the working entity is detected and no fault of the protection entity is detected. At the same time, the protection group operates in a non-reverse mode.

The protection switching implemented correspondingly specifically is to maintain the outbound port of the FDB entry corresponding to the ESP to be the corresponding protection outbound port. At this moment, this group of TESIs still operate on the protection entity.

For the fourth condition, the current status detection specifically is a condition that a fault recovery of the working entity is detected and no fault of the protection entity is detected. At the same time, the protection group operates in a reverse mode.

The protection switching implemented correspondingly specifically is to, after the endpoint of the protection group waiting for a period of time, namely, waiting until the fault is ensured to be recovered, recover and redirect the TESI to the working entity, and at the endpoint, update or restore the outbound port corresponding to the FDB entry of the corresponding ESP to be the working outbound port. This group of TESIs will operate on the working entity.

Herein, it should be pointed out that the method of the disclosure further supports a scene that a working entity corresponds to one or more protection entities.

In conclusion, the disclosure mainly includes the following contents:

I. a group of TESIs protected by a protection group is specified at an endpoint of the protection group.

Herein, for the preset protection group, a working entity and a protection entity of the protection group need to be specified, wherein the working entity and the protection entity share two same endpoints. A group of TESIs protected by the protection group is specified, and the group of TESIs can traverse the working entity or the protection entity.

It should be pointed out that under the normal condition, the working entity refers to an entity traversed by the protected object; the protection entity is a backup entity corresponding to the working entity; the protected object operates on the working entity; and when a switching event happens, the protected object on the influenced working entity is switched onto the protection entity.

II. FDB entries are configured at the endpoint for bi-directional ESPs of the group of the TESIs, and outbound ports are specified; and essential information of the FDB entry includes a destination MAC, a VLAN identification and an outbound port, namely, <DA, VID>→OutPort. Herein, OutPort can be called as an outbound port as well as a port number.

Wherein, the outbound port of the FDB entry configured for the ESP of the group of TESIs on the endpoint, in which the ESP points to another endpoint, include a working outbound port and at least one protection outbound port.

III. Under the normal condition, the protected group of TESIs operates on the working entity, and the working outbound port is selected as the outbound port corresponding to the FDB entry.

IV. In case that a protection switching event happens, the protected group of TESIs need to be switched from the working entity onto the protection entity, the protection outbound port corresponding to the protection entity is selected to be the outbound port corresponding to the FDB entry.

V. If the protected group operates in a non-reverse mode, when the working entity recovers from the fault and the protection entity has no fault, the outbound port corresponding to the FDB entry at the endpoint maintains at the selected protection outbound port.

VI. If the protected group operates in a reverse mode, when the working entity recovers from the fault and the protection entity has no fault, the working outbound port is selected to be the outbound port corresponding to the FDB entry after the endpoint waiting for a period of time.

Next, the disclosure is illustrated by examples.

Example I

Figure 4:
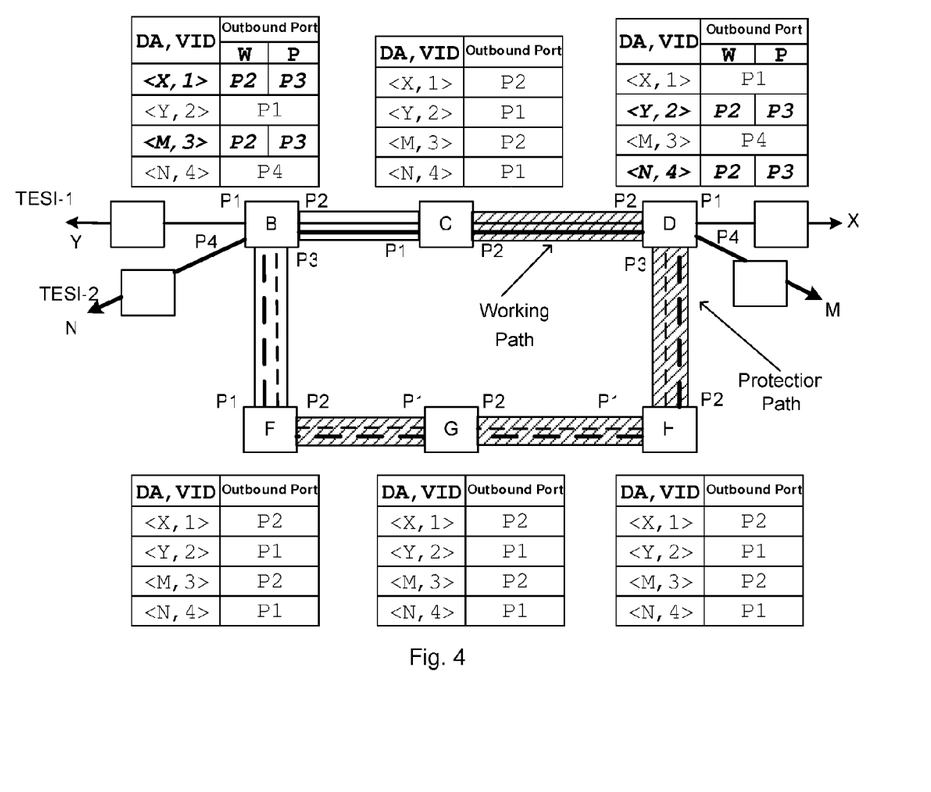
FIG. 4 shows a schematic diagram of an embodiment of the disclosure.

As shown in FIG. 4, B-C-D is an bearing path of end-to-end TESIs, namely, TESI-1 and TESI-2, wherein B-C-D is an working path and B-F-G-H-D is an protection path for the working path. The working path and the protection path constitute a path protection group. Protected objects, TESI-1 and TESI-2, of the path protection group are respectively configured on the endpoints B and D of the protection group. Wherein, it is presumed that the B-VID of the ESP in the Y→X direction of TESI-1 is 1, the B-VID of the ESP in the reverse direction is 2; and that B-VID of the ESP in the N→M direction of TEST-2 is 3, B-VID of the ESP in the reverse direction is 4. In FIG. 4, refers to the path protection group; TESI-1 and TESI-2 are respectively represented by different thick solid lines, wherein TESI-2 is the thickest and TESI-1 is the thinnest; and bridge equipments are represented as □. In the tables corresponding to the nodes, characters in deep color indicate that the outbound port corresponding to the ESP have both a working outbound port and a backup outbound port; and characters in light color indicate that there is only one outbound port.

FDB entries are configured for the nodes in the path protection group, wherein the FDB entries of the intermediate nodes C, F, G and H of the protection group have only one outbound port, as shown in the tables above and below the nodes in FIG. 4. These entries can ensure bi-directional ESP communication of TESI-1 and TESI-2 when the protection group operates on the working path or the protection path. For the end node B of the protection group, an entry <Y, 2>→P1 is configured on the end node B for the ESP in the X→Y direction of TESI-1; an entry <X, 1>→P2/P3 is configured for the ESP in the Y→X direction, wherein P2 is a working outbound port pointing to the working path, and P3 is a protection outbound port pointing to protection path. Likewise, the configuration of the bi-directional ESP of TESI-2 on the end node B and the bi-directional ESPs of TESI-1 and TESI-2 on the end node D are shown respectively in the tables above the nodes in FIG. 4. When the working path is the normal condition, the working outbound ports are selected as the outbound ports of the FDB entries corresponding to the ESPs of TESI-1 and TESI-2, and forwarding is performed according to the working outbound port; and when the protection group is switched to the protection path, the outbound ports of the FDB entries corresponding to the ESPs are updated into the preset protection outbound ports.

Example II

Figure 5:
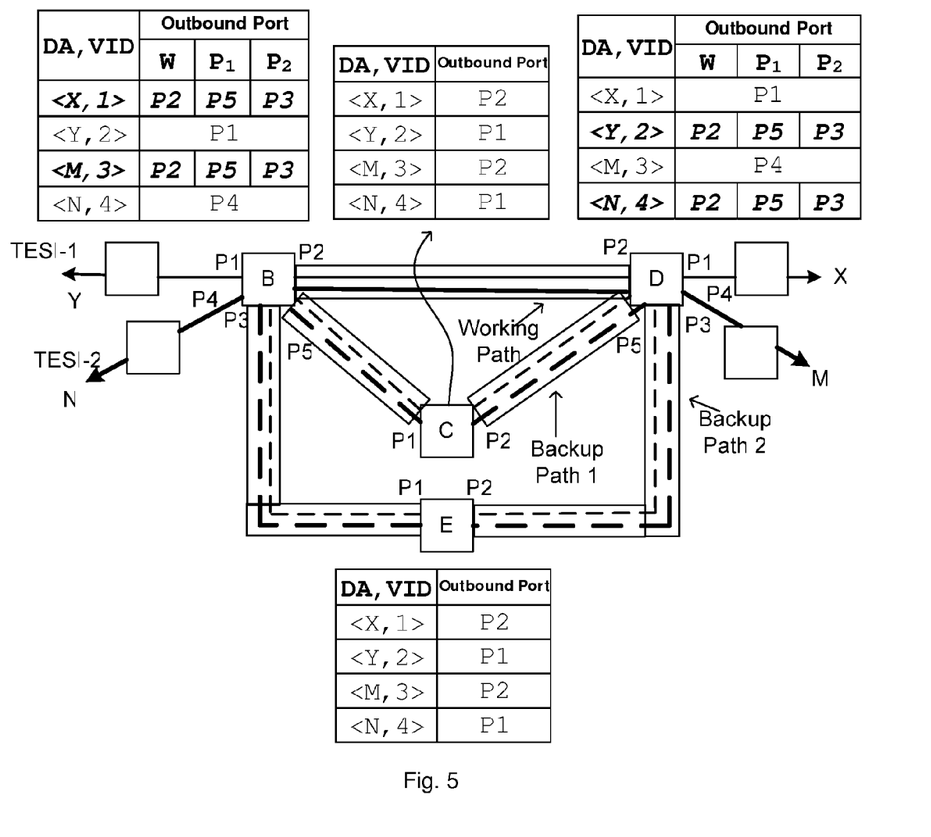
FIG. 5 shows a schematic diagram of another embodiment of the disclosure.

As shown in FIG. 5, B-D is an bearing path of end-to-end TESIs, namely, TESI-1 and TESI-2; wherein B-D is a working path, and both B-C-D and B-E-D are protection paths of the working path. One working path and two protection paths constitute a path protection group. Protected objects, TESI-1 and TESI-2, of the path protection group are respectively configured on the endpoints B and D. Wherein, it is presumed that the B-VID of the ESP in the Y→X direction of TESI-1 is 1, the B-VID of ESP in the reverse direction is 2; and that the B-VID of the ESP in the N→M direction of TESI-2 is 3, the B-VID of the ESP in the reverse direction is 4. In FIG. 5, refers to the protection group; TESI-1 and TESI-2 are respectively represented by different thick solid lines, wherein TESI-2 is the thickest and TESI-1 is the thinnest; and bridge equipments are represented as □. In the tables corresponding to the nodes, characters in deep color indicate that the outbound port corresponding to the ESP have a working outbound port and backup outbound ports; and characters in light color indicate that there is only one outbound port.

FDB entries are configured for the nodes in the protection group, wherein the outbound ports of the FDB entries of the intermediate nodes C and E of the protection group are shown in tables above the node C and below the node E in FIG. 5. These entries can ensure bi-directional ESP communication of TESI-1 and TESI-2 when the protection group operates on the working path or the protection path. For the end node B of the protection group, an FDB entry <Y, 2>→P1 is configured on the end node B for the ESP in the X→Y direction; an FDB entry <X, 1>→P2 is configured for the ESP in the Y→X direction, wherein P2 is a working outbound port, and outbound ports P5/P3 are pre-configured on the node B for the ESP as protection outbound ports. Likewise, the configuration of the FDB of the end node B is shown in the table above the node in FIG. 5. When the working entity is in the normal condition, forwarding is performed according to the working outbound port; when an automatic protection switching event or a manual switching event happens, the protection group switches TESI-1 and TESI-2 on the working entity onto the protection entity, and updates the outbound ports of the FDB entries corresponding to the ESPs to be the protection outbound ports, and then forwarding is performed according to the protection outbound port. Since the protection group has two protection paths, two protection outbound ports are provided, then protection switching can be performed by selecting one of the protection entities according to certain principles, such as the priorities of the protection paths in the protection group, the path status of the protection paths and the like. It is assumed that the protection path 1 is selected for the protection switching. Then the outbound port of the FDB entry of the ESP in the Y→X direction of the node B is updated into P5, the outbound port of the FDB entry of the ESP in the N→M direction of the node B is updated into P5; and the outbound port of the FDB entry of the ESP in the X→Y direction of the node D is updated into P5, the outbound port of the FDB entry of the ESP, in the M→N direction of the node B is updated into P5.

A system for Ethernet path protection switching includes a setting unit, a detecting unit and a switching unit; wherein the setting unit is configured to set a group of TESIs, which are protected by a protection group, at an endpoint of the protection group, and set a working entity and a protection entity in the protection group; the detecting unit is configured to detect the statuses of the working entity and the protection entity; and the switching unit is configured to implement path protection switching, according to the outbound port configured for the ESP of the TESI at the endpoint of the protection group and in conjunction with a corresponding protection switching mechanism selected in current status detection.

Herein, the switching unit further includes a configuration module and a protection switching implementation module; wherein the configuration module is configured to configure an FDB entry for the ESP of the TESI at the endpoint of the protection group respectively, wherein essential information of the FDB entry includes: a destination MAC Address, a VLAN identification and an outbound port. Herein, the outbound port includes a working outbound port and one or more protection outbound ports, which are respectively configured for the ESP of the TESI at the endpoint of the protection group; the working outbound port corresponds to the working entity of the protection group, and the protection outbound port corresponds to the protection entity. The protection switching implementation module is configured to implement the path protection switching by selecting the corresponding working outbound port or protection outbound port according to the outbound ports corresponding to the working entity and the protection entity, which are configured at the endpoint of the protection group for the ESP of the TESI, and in conjunction with the current status detection.

Herein, since the current status detection scenes are different, the specific implementations of the protection switching implementation module, which implements the protection switching correspondingly, are different. These are elaborated specifically and respectively below.

The first kind of the specific implementation: the current status detection specifically is the normal condition that no fault of the working entity is detected.

Correspondingly, the protection switching implementation module is further configured to select a working outbound port as the outbound port corresponding to the FDB entry of the ESP at the endpoint of the protection group. At this moment, the group of TESIs operates on the working entity.

The second kind of the specific implementation: in case that a protection switching event happens, namely, the current status detection specifically is the condition that a fault of the working entity is detected and no fault of the protection entity is detected.

Correspondingly, the protection switching implementation module is further configured to redirect the TESI onto the protection entity, and update the outbound port of the FDB entry of the corresponding ESP to be the preset protection outbound port corresponding to the protection entity. After the protection switching, the group of TESIs will operate on the protection entity.

The third kind of the specific implementation: the current status detection specifically is the condition that fault recovery of the working entity is detected and no fault of the protection entity is detected. At the same time, the protection group operates in a non-reverse mode.

Correspondingly, the protection switching implementation module is further configured to maintain the outbound port of the FDB entry corresponding to the ESP to be the corresponding protection outbound port. At this moment, the group of the TESIs still operates on the protection entity.

The fourth kind of the specific implementation: the current status detection specifically is the condition that fault recovery of the working entity is detected and no fault of the protection entity is detected. At the same time, the protection group operates in a reverse mode.

Correspondingly, the protection switching implementation module is further configured to recover and redirect the TESI onto the working entity, and at the endpoints, update or restore the outbound port corresponding to the FDB entry of the corresponding ESP to be the working outbound port, after the endpoint of the protection group waiting for a period of time.

Herein, the endpoint mentioned above can be expressed as "endpoint" or "end point", and the outbound port can be expressed as "outbound port"; the word "traverse" mentioned in the statement that a group of TESIs traverses a same path can be expressed as "traverse", which means that the paths traversed by the group of the TESIs are exactly the same.

The description above is only preferred embodiments of the disclosure, and is not intended to limit the protection scope of the disclosure.

The invention claimed is:

1. A switching method for Ethernet path protection, comprising:

setting, at an endpoint of a protection group, a Traffic Engineering Service Instance (TESI) protected by the protection group, wherein the protection group comprises a working entity and a protection entity, and the working entity is a portion of a path that the TESI traverses;

configuring a Filter Data Base (FDB) entry at the endpoint of the protection group for an Ethernet Switching Path (ESP) of the TESI; wherein essential information of the configured FDB entry comprises: a destination Media Access Control (MAC) address, a Virtual Local Area Network (VLAN) identification and an outbound port number; the outbound port number further comprises a working outbound port number and one or more protection outbound ports number; the working outbound port number corresponds to the working entity of the protection group, and the protection outbound port number corresponds to the protection entity;

detecting statuses of a working entity and a protection entity arranged in the protection group; and updating the FDB entry at the endpoint of the protection group to implement path protection switching, according to the outbound port number configured for the ESP of the TESI at the endpoint of the protection group and in conjunction with a corresponding protection switching mechanism selected in current status detection;

wherein updating the FDB entry at the endpoint of the protection group comprises: under a normal condition that no fault of the working entity is detected, selecting the working outbound port number as the outbound port number in the FDB entry of the ESP;

or, under a condition that a fault of the working entity is detected and no fault of the protection entity is detected, updating the outbound port number in the FDB entry of the corresponding ESP to be the preset protection outbound port number corresponding to the protection entity so as to redirect the TESI to the protection entity;

or, when the protection group operates in a non-revertive mode, fault recovery of the working entity is detected and no fault of the protection entity is detected, maintaining the outbound port number in the FDB entry corresponding to the ESP to be the corresponding protection outbound port number;

or, when the protection group operates in a revertive mode, fault recovery of the working entity is detected and no fault of the protection entity is detected, after the endpoint of the protection group waiting for a period of time, updating or restoring the outbound port number in the FDB entry of the corresponding ESP to be the working outbound port number so as to recover and redirect the TESI to the working entity.

2. The method according to claim 1, wherein the protection group consists of the working entity and the protection entity; the working entity specifically is a same path traversed by the group of TESIs, and the protection entity specifically is a backup entity corresponding to the working entity; the working entity and the protection entity share the same endpoint.

3. The method according to claim 1, further comprising configuring a FDB entry at an intermediate node of the protection group.

4. The method according to claim 1, wherein one working entity corresponds to one or more protection entities.

5. A switching system for Ethernet path protection, comprising: a setting unit, a configuration module, a detecting unit and a protection switching implementation module; wherein the setting unit is configured to set, at an endpoint of a protection group, a TESIs protected by the protection group, and set a working entity and a protection entity in the protection group, wherein the working entity is a portion of a path that the TESI traverses;

a configuration module is configured to a FDB entry at the endpoint of the protection group for an ESP of the TESI; wherein essential information of the configured FDB entry comprises: a destination MAC address, a VLAN identification and an outbound port number; the outbound port number further comprises a working outbound port number and one or more protection outbound ports number; the working outbound port number corresponds to the working entity of the protection group, and the protection outbound port number corresponds to the protection entity the detecting unit is configured to detect statuses of the set working entity and the protection entity;

a protection switching implementation module is configured to update the FDB entry at the endpoint of the protection group to implement path protection switching, according to the outbound port number configured for the ESP of the TESI at the endpoint of the protection group and in conjunction with a corresponding protection switching mechanism selected in current status detection;

wherein updating the FDB entry at the endpoint of the protection group comprises: under a normal condition that no fault of the working entity is detected, selecting the working outbound port number as the outbound port number in the FDB entry of the ESP;

or, under a condition that a fault of the working entity is detected and no fault of the protection entity is detected, updating the outbound port number in the FDB entry of the corresponding ESP to be the preset protection outbound port number corresponding to the protection entity so as to redirect the TESI to the protection entity;

or, when the protection group operates in a non-revertive mode, fault recovery of the working entity is detected and no fault of the protection entity is detected, maintaining the outbound port number in the FDB entry corresponding to the ESP to be the corresponding protection outbound port number;

or, when the protection group operates in a revertive mode, fault recovery of the working entity is detected and no fault of the protection entity is detected, after the endpoint of the protection group waiting for a period of time, updating or restoring the outbound Port number in the FDB entry of the corresponding ESP to be the working outbound Port number so as to recover and redirect the TESI to the working entity.

6. The method according to claim 1, wherein the ESP which may need to update FDB entry is the ESP directing to the protection group.

* * * * *